US006652287B1

(12) United States Patent
Strub et al.

(10) Patent No.: US 6,652,287 B1
(45) Date of Patent: Nov. 25, 2003

(54) ADMINISTRATOR AND INSTRUCTOR COURSE MANAGEMENT APPLICATION FOR AN ONLINE EDUCATION COURSE

(75) Inventors: Henry B. Strub, Lincolnwood, IL (US); Stepanie B. Woodson, Chicago, IL (US); Joshua D. Barr, Evanston, IL (US); Alan S. Drimmer, Chicago, IL (US)

(73) Assignee: Unext.com, Deerfield, IL (US)

( * ) Notice: Subject to any disclaimer, the term of this patent is extended or adjusted under 35 U.S.C. 154(b) by 115 days.

(21) Appl. No.: 09/746,592

(22) Filed: Dec. 21, 2000

(51) Int. Cl.[7] .............................................. G09B 11/00
(52) U.S. Cl. ..................................... 434/365; 434/322
(58) Field of Search ................................. 434/118, 322, 434/323, 350, 362, 365; 705/1, 14; 709/212

(56) References Cited

U.S. PATENT DOCUMENTS

| | | | |
|---|---|---|---|
| 4,772,206 A | | 9/1988 | Kerr et al. |
| 4,820,167 A | | 4/1989 | Nobles et al. |
| 4,877,404 A | | 10/1989 | Warren et al. |
| 5,002,491 A | | 3/1991 | Abrahamson et al. |
| 5,267,865 A | | 12/1993 | Lee et al. |
| 5,310,349 A | * | 5/1994 | Daniels et al. ............... 434/350 |
| 5,395,243 A | | 3/1995 | Lubin et al. |
| 5,441,415 A | | 8/1995 | Lee et al. |
| 5,597,312 A | | 1/1997 | Bloom et al. |
| 5,727,950 A | | 3/1998 | Cook et al. |
| 5,788,508 A | | 8/1998 | Lee et al. |
| 5,810,605 A | | 9/1998 | Siefert |
| 5,823,788 A | | 10/1998 | Lemelson et al. |
| 5,864,869 A | * | 1/1999 | Doak et al. ............... 707/104.1 |
| 5,909,589 A | | 6/1999 | Parker et al. |
| 5,957,699 A | | 9/1999 | Peterson et al. |
| 5,974,446 A | | 10/1999 | Sonnenreich et al. |
| 5,978,648 A | * | 11/1999 | George et al. ............... 434/362 |
| 5,987,443 A | | 11/1999 | Nichols et al. |
| 6,014,134 A | | 1/2000 | Bell et al. |
| 6,024,577 A | | 2/2000 | Wadahama et al. |
| 6,029,043 A | | 2/2000 | Ho et al. |
| 6,039,575 A | | 3/2000 | L'Allier et al. |
| 6,064,856 A | * | 5/2000 | Lee et al. ............... 434/350 |
| 6,064,865 A | | 5/2000 | Kuo et al. |
| 6,302,698 B1 | * | 10/2001 | Ziv-El ............... 434/323 |
| 6,411,796 B1 | * | 6/2002 | Remschel ............... 434/350 |
| 6,470,171 B1 | * | 10/2002 | Helmick et al. ............ 434/362 |

FOREIGN PATENT DOCUMENTS

WO     WO 98/22864     5/1998

OTHER PUBLICATIONS

Yahoo! Internet Life Magazine Names Dakota State University the #12 Most Wired College in the Country, http://www.dsu.edu/yahoo.htm: Nov. 23, 1998.

DSU Open Internet Courses, http://www.courses.dsu.edu/disted/courses.htm: Nov. 23, 1998.

(List continued on next page.)

*Primary Examiner*—Joe H. Cheng
*Assistant Examiner*—Kathleen M Christman
(74) *Attorney, Agent, or Firm*—Brinks Hofer Gilson & Lione

(57) ABSTRACT

A system and method for permitting an administrator or faculty member in an online education course to monitor and manage faculty and student activity is provided. The system includes a computer network having an administrator and instructor course management application tool for generating administrator and instructor interfaces displaying student or faculty information and facilitating an instructor's ability to manage student activities, as well as facilitating administrator management and review of both students and faculty. The method includes automatically recording student and faculty access to online educational course resources and tasks, and presenting a plurality of interactive student and faculty management selections to administrators and faculty in response to queries for student and faculty information.

13 Claims, 19 Drawing Sheets

OTHER PUBLICATIONS

Menu Pages for "The Commons", http://www.wcc–eun.com/wln/commons/index.html: Nov. 5, 1998.

Home Pages For University Without Walls At the University of Massachusetts Amherst, http://www.klaatu.oit.umass.edu/uww/uww_home.html: Nov. 5, 1998.

Slide Show of Information Relating To Online Educational Programs, http://www.howardcc.edu/hcc/facpres/sld003.htm: Nov. 5, 1998 (Slides 3–13 of 14).

ADEC and Virtual Universities "Toward Common Vision and Action", http://www.adec.edu/vuniv/adec/place1.html: Nov. 5, 1998.

SINEwave The COB Virtual Campus (Distance Learning at the College of Business at UCB), http://www.colorado.edu/infs/jcb/sinewave/service/virtualcampus/: Nov. 5, 1998.

Welcome to the California Virtual University, http://www.california.edu/about.html: Nov. 5, 1998.

Article Discussing Design of Online University: Johnstone/Jones: Western Governors University, http://www.ttu.edu/lists/acw–1/9707/0078.html: Nov. 5, 1998.

Web Pages Relating To Western Governors University Website at http://www.wgu.edu/wgu/academics/dist_learning/html: Nov. 5, 1998.

Website for the University of Phoenix Online Campus at http://www.uophx.edu/online/on1_camp.htm: Nov. 5, 1998.

Printout of Website for: The Electronic University Network at http://www.wcc–eun.com/eun.html: Nov. 5, 1998.

Website Entitled Brevard Community College Online . . . Telecommute on the Information Super Highway with BCC, http://brevard.cc.fl.us/online/campus/: Nov. 5, 1998.

Micron University Home Page Entitled "Micron U", http://programs.micronpc.com/micro...OL1RTR4UWVPBGP3&where=home&why=gen: Nov. 4, 1998.

Meyrowitz, "Intermedia: The Architecture and Construction of an Object–Oriented Hypermedia System and Applications Framework", OOPSLA '86 Proceedings published Sep. 1986.

Bonar et al., "An Object–Oriented Architecture For Intelligent Tutoring Systems", OOPSLA '86 Proceedings published Sep. 1986.

Weyer et al., "A Prototype Electronic Encyclopedia", ACM Transactions on Office Information Systems, vol. 3, No. 1, Jan. 1985, pp. 63–88.

Article in Byte Magazine entitled "The Difference in Higher Education" dated Feb. 1987.

Morris et al., "Andrew: A Distributed Personal Computing Environment", Communications of the ACM, Mar. 1986, vol. 29, No. 3.

Wiseman, "Teaching (Virtually) Teaching", http://gsula.gsu.edu/faculty/lawppw/vtt/virtual.html, Nov. 23, 1998.

Patent Abstracts of Japan, English Abstract for Japanese Application Publication No. 08235089 "Education Support System" Published Sep. 13, 1996.

Patent Abstracts of Japan, English Abstract for Japanese Application Publication No. 10040199 "Education Support System" Published Feb. 13, 1998.

Web Page Entitled "Welcome to . . . Apollo Group, Inc.", http://www.apollogrp.com/: Nov. 5, 1998.

U.S. patent application, Ser. No. 09/884,168 filed Jun. 18, 2001, entitled "Method and System for Analyzing Student Performance in an Electronic Course" and the inventor is Alan Drimmer.

* cited by examiner

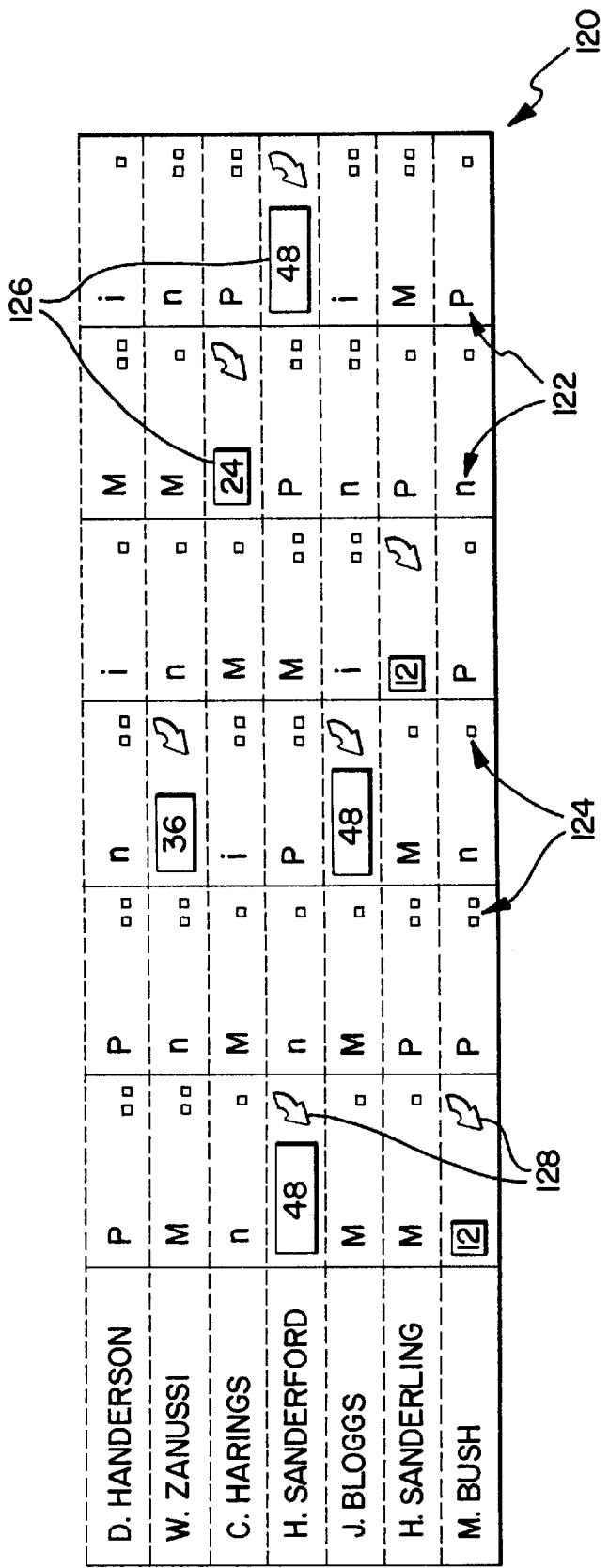

FIG. 6B

GRADEBOOK

CORPORATE FINANCE: ASSET VALUATION  
SECTION AV-IO37   INSTRUCTOR'S NAME   SELECT SECTION

▨ INCOMPLETE   ▨ NEEDS IMPROVEMENT   ▨ MASTERY   ▨ EXEMPLARY   | AV-IO37 ▽ | GO |

127 (bracket grouping NEEDS IMPROVEMENT and MASTERY)

| STUDENT | PROJECT 1 | | | | | PROJECT 2 | | | FINAL GRADE |
|---|---|---|---|---|---|---|---|---|---|
| | TASK 1 | TASK 2 | TASK 3 | TASK 4 | ACTIVITY GRADE | TASK 1 | TASK 2 | GRADE | GRADE *WITH DISTINCTION |
| BLOGGS, JOE | ▨ | ▨ | ▨ | ▨ | ○ | □ | □ | □ | ▨ * |
| ... | ... | | | | | | | | |

FIG. 6C

GRADEBOOK

CORPORATE FINANCE: ASSET VALUATION  
SECTION AV-IO37   INSTRUCTOR'S NAME   SELECT SECTION

○ INCOMPLETE   ◉ NEEDS IMPROVEMENT   ◉ MASTERY   ◉ EXEMPLARY   □ 2nd GRADE   | AV-IO37 ▽ | GO |

129 (bracket grouping NEEDS IMPROVEMENT, MASTERY, EXEMPLARY)

| STUDENT | PROJECT 1 | | | | | PROJECT 2 | | | FINAL GRADE |
|---|---|---|---|---|---|---|---|---|---|
| | TASK 1 | TASK 2 | TASK 3 | TASK 4 | ACTIVITY GRADE | TASK 1 | TASK 2 | GRADE | GRADE *WITH DISTINCTION |
| BLOGGS, JOE | ◉ | ○ | □ | ▨ | ○ | ◉ | ◉ | ◉ | □ |
| ... | ... | | | | | | | | |

FIG. 7

GRADE SUBMISSION — 130

CORPORATE FINANCE: ASSET VALUATION
SECTION AV-1037
BLOGGS, JOE

INSTRUCTOR'S NAME

| PROJECT 1, TASK 2 |

03/01/2000          SENARIO ONE TASK TWO.xls — 132

| STUDENT COMMENTS |

I ADDED THE CHANGES YOU SUGGESTED. -- JB — 134

| INSTRUCTOR COMMENTS |

YOUR SECOND SUBMISSION IS MUCH BETTER. — 136

ENTER GRADE ▽ — 138        SAVE — 140

FIG. 8

GRADEBOOK FOR JOE BLOGGS — 131

CORPORATE FINANCE: ASSET VALUATION — 137   139   133
SECTION AV-1037     135

|  |  | DATE SUBMITTED | DATE GRADED | GRADE |
|---|---|---|---|---|
| SENARIO ONE | TASK 1 | 01/01/2000 | 01/02/2000 | A |
|  | TASK 2 | 02/01/2000 | 02/03/2000 | A |
|  | TASK 3 | 02/02/2000 | 02/03/2000 |  |
|  | ACTIVITY |  | 02/03/2000 | DONE |
|  | GRADE |  |  |  |
| SENARIO TWO | TASK 1 | SUBMIT — 141 |  |  |
|  | TASK 2 | SUBMIT |  |  |
|  | TASK 3 | SUBMIT |  |  |
| FINAL |  | SUBMIT |  |  |

FIG. 14

| CARDEAN | ⊙ |
|---|---|
| PROGRAM | ● |
| COURSE | ⊙ |
| FACULTY | ⊙ |
| STUDENT | ⊙ |

SUMMARY

ENROLLMENT

COMPLETION
BY
COURSE

COMPLETION
BY
FACULTY

TIME
TO
COMPLETION

DROP
OUT

RESPONSE
TIME

COMPLAINTS

COST
OF
DELIVERY

— 242

SELECT PROGRAM          260

- MBA EXECUTIVE — 262
  ○ FINANCE — 264
    □ ASSET VALUATION — 266
    □ CAPITAL BUDGETING
    □ PORTFOLIO MANAGEMENT
    □ THE CAPITAL ASSET PRICING MODEL
    □ THE DISCOUNT RATE IN PRACTICE
  ○ MARKETING
    □ PRINCIPLES OF PRODUCT DECISIONS
    □ PRINCIPLES OF PROMOTION
    □ PRINCIPLES OF DISTRIBUTION
  ○ ACCOUNTING
    □ CORPORATE WEALTH
    □ WEALTH CREATION, CASH FLOW, AND RISK ANALYSIS
    □ THE ACCOUNTANT'S LANGUAGE
    □ PROFITABILITY ANALYSIS FOR A PRODUCT
  ○ eBUSINESS
  ○ MANAGING INNOVATIONS
  ○ LEADING AND MANAGING ORGANIZATIONS
  ○ BUSINESS WRITING
- MSIT
  ○ 505 MANAGING IN AN AGE OF INFORMATION TECHNOLOGY CHANGE
  ○ OR 645 PROJECT MANAGEMENT
  ○ 515 MANAGEMENT OF INFORMATION SYSTEMS
  ○ 525 INFORMATION SYSTEMS STRATEGIC PLANNING
  ○ 535 TELECOMMUNICATIONS
  ○ 545 EMERGING TECHNOLOGIES

FIG. 15

| CARDEAN ⊙ |
| PROGRAM ⊙ |
| COURSE ● |
| FACULTY ⊙ |
| STUDENT ⊙ |

242

SELECT COURSE

268

- FINANCE: ASSET VALUATION — 270
- FINANCE: CAPITAL BUDGETING
- FINANCE: PORTFOLIO MANAGEMENT
- FINANCE: THE CAPITAL ASSET PRICING MODEL
- FINANCE: THE DISCOUNT RATE IN PRACTICE
- FINANCE: WEALTH CREATION, CASH FLOW, AND RISK ANALYSIS
- MARKETING: PRINCIPLES OF PRODUCT DECISIONS
- MARKETING: PRINCIPLES OF PROMOTION
- MARKETING: PRINCIPLES OF DISTRIBUTION
- ACCOUNTING: CORPORATE WEALTH
- ACCOUNTING: WEALTH CREATION, CASH FLOW, AND RISK ANALYSIS
- ACCOUNTING: THE ACCOUNTANT'S LANGUAGE
- ACCOUNTING: PROFITABILITY ANALYSIS FOR A PRODUCT
- eBUSINESS
- MANAGING INNOVATIONS
- LEADING AND MANAGING ORGANIZATIONS
- BUSINESS WRITING
- 505 MANAGING IN AN AGE OF INFORMATION TECHNOLOGY CHANGE
- OR 645 PROJECT MANAGEMENT
- 515 MANAGEMENT OF INFORMATION SYSTEMS
- 525 INFORMATION SYSTEMS STRATEGIC PLANNING
- 535 TELECOMMUNICATIONS
- 545 EMERGING TECHNOLOGIES
- 665 DATA COMMUNICATION
- 675 SYSTEMS DESIGN
- 695 INTRANETS

SUMMARY

ENROLLMENT

COMPLETION BY COURSE

COMPLETION BY FACULTY

TIME TO COMPLETION

DROP OUT

RESPONSE TIME

COMPLAINTS

COST OF DELIVERY

FIG. 17

○ CARDEAN
○ PROGRAM
○ COURSE
● FACULTY
○ STUDENT

SELECT FACULTY

JANE DOE ⟩—282
JOHN DOE
FRANK FACULTY
IAN INSTRUCTOR

SUMMARY
ENROLLMENT
COMPLETION BY COURSE
COMPLETION BY FACULTY
TIME TO COMPLETION
DROP OUT
RESPONSE TIME
COMPLAINTS
COST OF DELIVERY

FACULTY: FRANK FACULTY

284 → PERSONAL DATA — 288

| | | 290 |
|---|---|---|
| NAME | FRANK FACULTY | |
| E-MAIL | F.Faculty_cardean.com | |
| ADDRESS | 123 MAIN ST., CHICAGO, IL 60012 | |
| EDUCATION | B.S. BUSINESS ADMINISTRATION M.B.A. FINANCE (STANFORD UNIVERSITY) Ph.D. FINANCE (UNIVERSITY OF CHICAGO) | |
| TITLE | ADJUNCT FACULTY | |
| DATE HIRED | 12/12/99 | |

286 → HISTORY WITH CARDEAN — 294

| | | 292 |
|---|---|---|
| TRAINING | 12/15/99 | |
| TAUGHT TEAMS | AV-1037 (START 12/15/99), AV-1038 (START 01/15/00) — 296 | |
| TEACHING TEAMS | AV-1039 (START 02/15/00) | |
| EVALUATION | NEXT EVALUATION 06/12/00 | |
| COMPLAINTS | BROWN: ASSIGNMENT TURNAROUND TIME (CRM-455) DAVIDSON: QUALITY OF FEEDBACK (CRM-647) — 298 | |

[ SEND MAIL ] — 300

PERFORMANCE IN TEAM AV-1037

CARDEAN ⊙
PROGRAM ⊙
COURSE ⊙
FACULTY ●
STUDENT ⊙

SUMMARY
ENROLLMENT
COMPLETION BY COURSE
COMPLETION BY FACULTY
TIME TO COMPLETION
DROP OUT
RESPONSE TIME
COMPLAINTS
COST OF DELIVERY

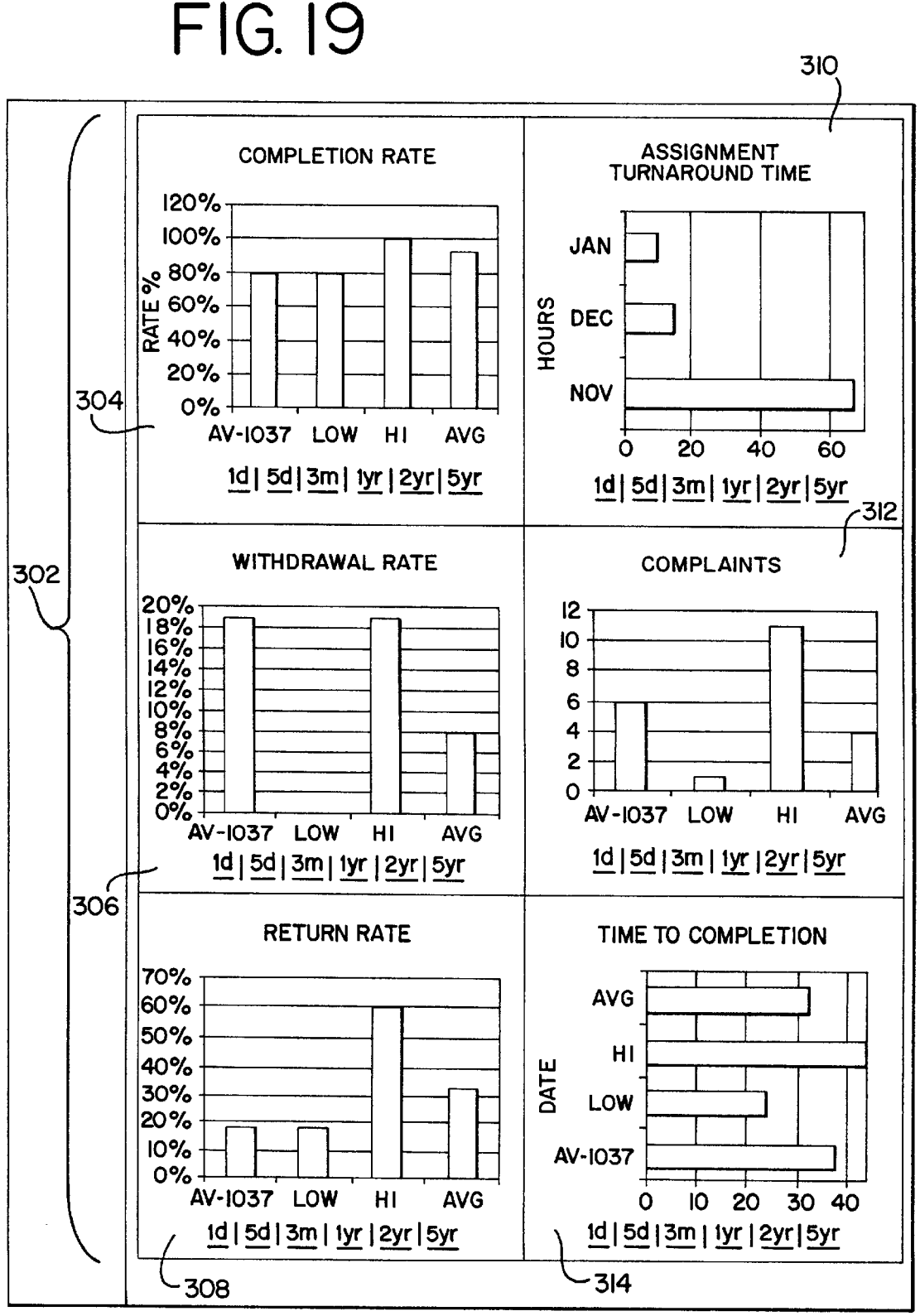

ADMINISTRATOR AND INSTRUCTOR COURSE MANAGEMENT APPLICATION FOR AN ONLINE EDUCATION COURSE

CROSS-REFERENCE TO RELATED APPLICATIONS

The present invention is related to the following patent applications that are assigned to the same assignee as the present invention, the subject matter of which are incorporated herein by reference thereto:
1. "Virtual University," U.S. application Ser. No. 09/344,732, filed Jun. 25, 1999, now abandoned.
2. "Online Collaborative Apprenticeship," U.S. application Ser. No. 09/344,659, filed Jun. 25, 1999, now U.S. Pat. No. 6,301,462.
3. "Online Virtual Campus," U.S. application Ser. No. 09/344,754, filed Jun. 25, 1999, now U.S. Pat. No. 6,347,333.

FIELD OF THE INVENTION

This invention relates to a software learning engine offered online via a network of multimedia nodes. More particularly, this invention relates to an administrator and instructor course management application for managing and monitoring student and instructor activity in an online educational course.

BACKGROUND

Traditional campus-based universities are often limited in the number of learners they can reach by limitations in their physical resources. Classroom and campus constraints generally dictate a relatively small consumer base embodied as learners.

In addition, fixed schedules, a passive learning approach and a relatively lengthy academic school year have resulted in the limited education models known today based on utilizing a physical campus with one teacher and many learners. One limitation of the prevailing education model is that it is only available to people, such as younger students during the first stages of their lives, who can dedicate the majority of their time to exclusively studying and attending classes.

Known methods of offering distance learning have not been able to harness the teaching techniques and material of first tier higher education institutions. Existing methods generally require that a learner become self taught with periodic assessments by the distance learning institution.

There is a need for an educational forum that provides interactive lessons asynchronously such that a learner can participate in a lesson using an on-demand schedule and also reap the benefits of an interactive learning environment. Such an educational forum should provide for access to large numbers of students that may be geographically dispersed while offering all students the guidance, feedback and access to resources generally available to traditional campus-based students. There is also a need for instructor tools in such an interactive environment to permit instructors to effectively monitor and manage students. Additionally, there is a need for administrator tools in this interactive environment to facilitate monitoring of instructors and the online educational forum as a whole.

BRIEF DESCRIPTION OF SEVERAL VIEWS OF THE DRAWINGS

FIG. 6A is an online instructor grade book interface generated by an administrator and instructor tool application according to a second preferred embodiment.

FIG. 6B illustrates a graphical grading scale for use in the online grade book of FIGS. 5 and 6A.

FIG. 6C illustrates an alternative graphical grading scale, for use in the online grade book of FIGS. 5 and 6A.

FIG. 7 is an instructor grade submission template suitable for use with the grade book of FIGS. 5 and 6.

FIG. 8 is a student view of the grade book of FIGS. 5 and 6.

FIG. 14 is an online educational system program selection screen.

FIG. 15 is an online educational system course selection screen.

FIG. 17 is an online educational system faculty selection screen.

FIG. 18 is a faculty data screen for a faculty member selected through the faculty selection screen of FIG. 17.

FIG. 19 is a continuation of the faculty data screen of FIG. 18 that illustrates faculty performance metrics for the selected faculty member.

DETAILED DESCRIPTION OF THE PRESENTLY PREFERRED EMBODIMENTS

In order to enhance an online educational experience and provide for effective and efficient student management by online faculty members, a system and method for providing faculty member tools in an online educational environment is described below. Furthermore, administrator tools and functionality are disclosed that permit the monitoring and assisting of faculty, as well as aiding management of the overall online educational environment. In order to provide an example of an appropriate environment within which preferred embodiments of the online faculty member and administrator tools may be described, an example of one suitable network and course structure is now described.

Figure 1:
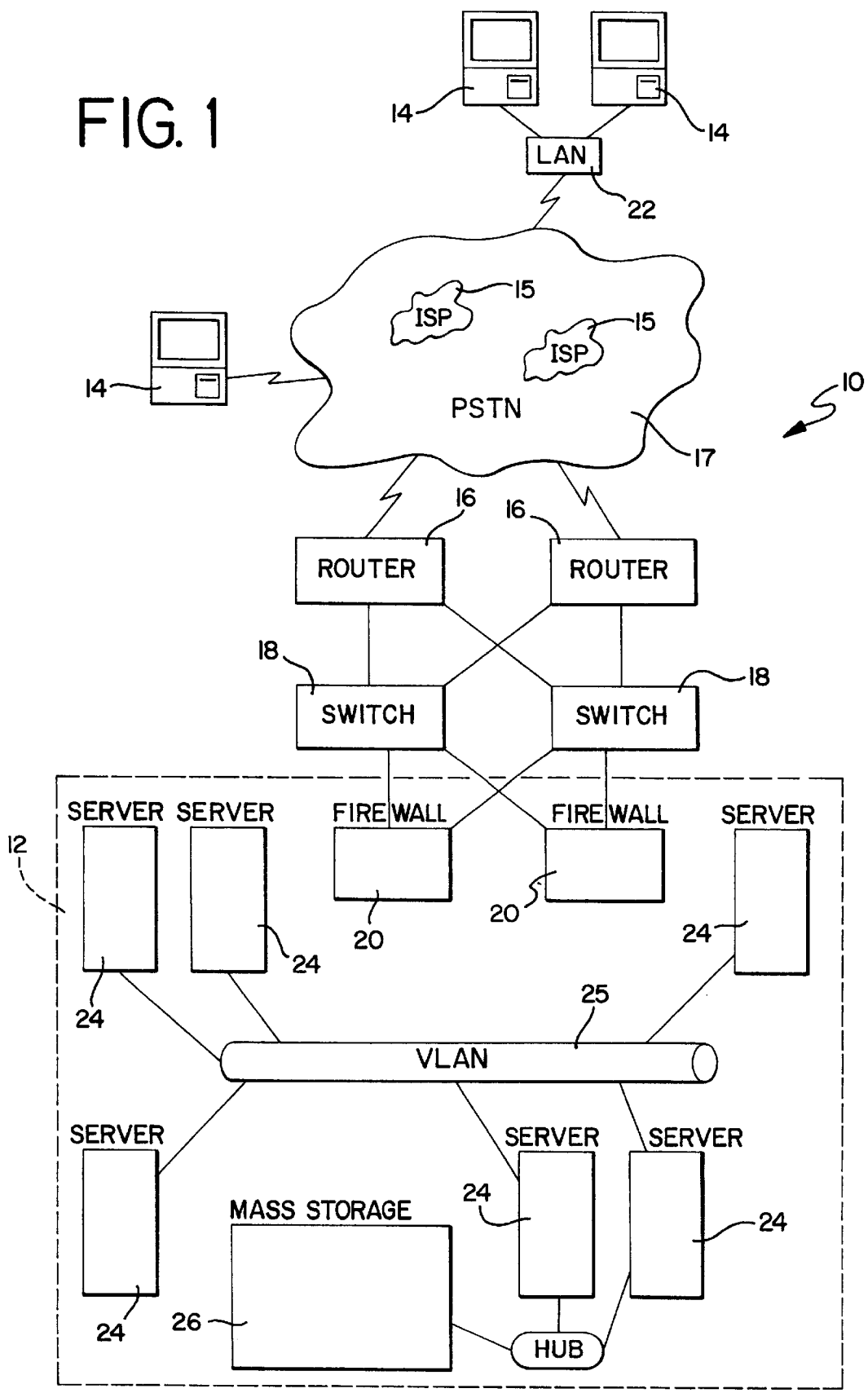
FIG. 1 illustrates a computer network according to a preferred embodiment.

Referring to FIG. 1, a preferred online educational network 10 is shown. The network 10 includes a server side 12 and a plurality of user computers 14. Each of the user computers 14 includes a processor, memory, a user input device such as a keyboard and/or mouse, a user output device such as a video display and may include other user output devices such as printers. The user computers 14 may be directly connected to an Internet Service Provider (ISP) 15 via a modem or other communication device. The user computers 14, via an ISP 15 or other communication device, may communicate with the server side 12 of the network 10 over the public switched telephone network (PSTN) 17. Alternatively, one or more user computers 14 may be connected to the internet via a server already operating on an internet backbone. Any of a number of commonly available communications means may be used by user computers to communicate with the internet.

The server side 12 of the network 10 communicates with the various users 14 through routers 16 and switches 18 that direct queries through a firewall 20 protecting the server side 12 from unauthorized access. Suitable routers and switches are Cisco 75xx routers and Cisco 55xx switches available from Cisco Systems, Inc. The user computers may interact with the server side 12 as if the server side 12 was a single entity in the network 10. The server side 12 of the network 10 may include a central server device or may include multiple processing and database sub-networks, such as cooperative or redundant processing and/or database servers that can be geographically dispersed throughout the network 10. In some implementations, groups of user computers 14 may communicate with the server side 12 through a local server 22. The local server 22 may be a proxy server or a caching server.

The server side 12 of the network 10 preferably includes one or more databases storing online course programming course materials. A large variety of course materials may be stored in the databases at the server side 12. For example, text, audio, video, graphics, animations, and illustrations may be included in the materials utilized in the particular online course that a student may use for online testing and assessment. A student may access the server side 12 of the network 10 using software residing and executed at the user's computer. The user software may include a generic Hypertext Markup Language (HTML) browser, such as Netscape Navigator, Microsoft Internet Explorer, or other commonly available Internet web browsers. In order to interpret the various multimedia materials utilized in an online educational course maintained on the server side 12, the user computers implement the browser software to interpret HTML and JavaScript commands and also preferably use standard browser plug-in, such as QuickTime and other commonly available audio and video data interpretation software. Although standard Internet connections using browsers that understand HTML, JavaScript and other standard Internet programs is preferred, the user software may also be a proprietary browser and/or other host access software.

Referring to the server side 12 of the network 10, a plurality of individual servers 24 may be connected together via an Ethernet connection via a local area network 25 such as a 100 Mbps VLAN. Mass storage devices, such as mass storage device 26, may be in communication with one or more of the servers 24 via a hub. Databases stored in the mass storage devices 26 may include an Enterprise Resource Planning (ERP) database, a Customer Relationship Management (CRM) database, and a user profile database. The ERP database preferably includes customer and billing information and standard payroll and accounting information relevant to the online educational system. The CRM database may be a standard CRM database such as those supported by Oracle Corporation of Redwood Shores, Calif.

In one embodiment, an online course is preferably stored on the server side 12 as a collection of HTML templates programmed to retrieve content information from the mass storage device 26 when a user computer 14 accesses a particular page in the online course. In one preferred embodiment, the servers 24 may contain online courses programmed using a customizable database format such as the database format and programming language available from BroadVision, Inc. of Redwood City, Calif. Suitable servers 24 may be E250, E450, and other servers available from Sun Microsystems, Inc. of Palo Alto, Calif. The mass storage device 26 may be one or more hard disk drive storage devices such as an EMC Symmetrix device available from EMC Corporation of Hopkinton, Massachusetts.

The user computers 14 may be operated by students taking online courses, adjunct faculty members (hereinafter instructors) leading the online courses, advisory faculty members overseeing the performance of a group of instructors, or administrators overseeing the online courses and educational environment as a whole. Each of the respective types of users preferably accesses information in the server side 12 of the network 10 through use of user identification and password prompts over the Internet. In one embodiment, all of the types of users may access the educational information and services through a standard Internet web page interfaces. Utilizing the above-described structure, students preferably sign up for and take online educational courses with other remotely located class mates who are typically grouped together in course sections based on course starting date so that, while each student may proceed at his or her own pace, the students may interact and provide some assistance to each other in a group learning environment.

In a preferred embodiment, the course structure for online courses residing on the server side 12 of the network 10 is a problem-based learning structure adapted for the online environment. The problem-based learning organization of the course materials is designed so that student learning is driven by learning outcomes linked to authentic projects or problems. Students learn on problems having real world relevance using a learning-by-doing approach. The "virtual university" embodied in the server side 12 of the network 10 provides this type of learning experience by combining the resources of traditional learning institutions (e.g., universities), that generally provide courses over a long period of time, with the techniques used in training courses, typically more intense, short courses directed towards a particular skill or technique. Combining a computerized communication network and courses embodied in software in the network allows coursework to be accomplished through asynchronous learning. Asynchronous learning allows a student to access educational material at a time convenient to the student while avoiding scheduling conflicts inherent in traditional learning institutions.

Figure 2:
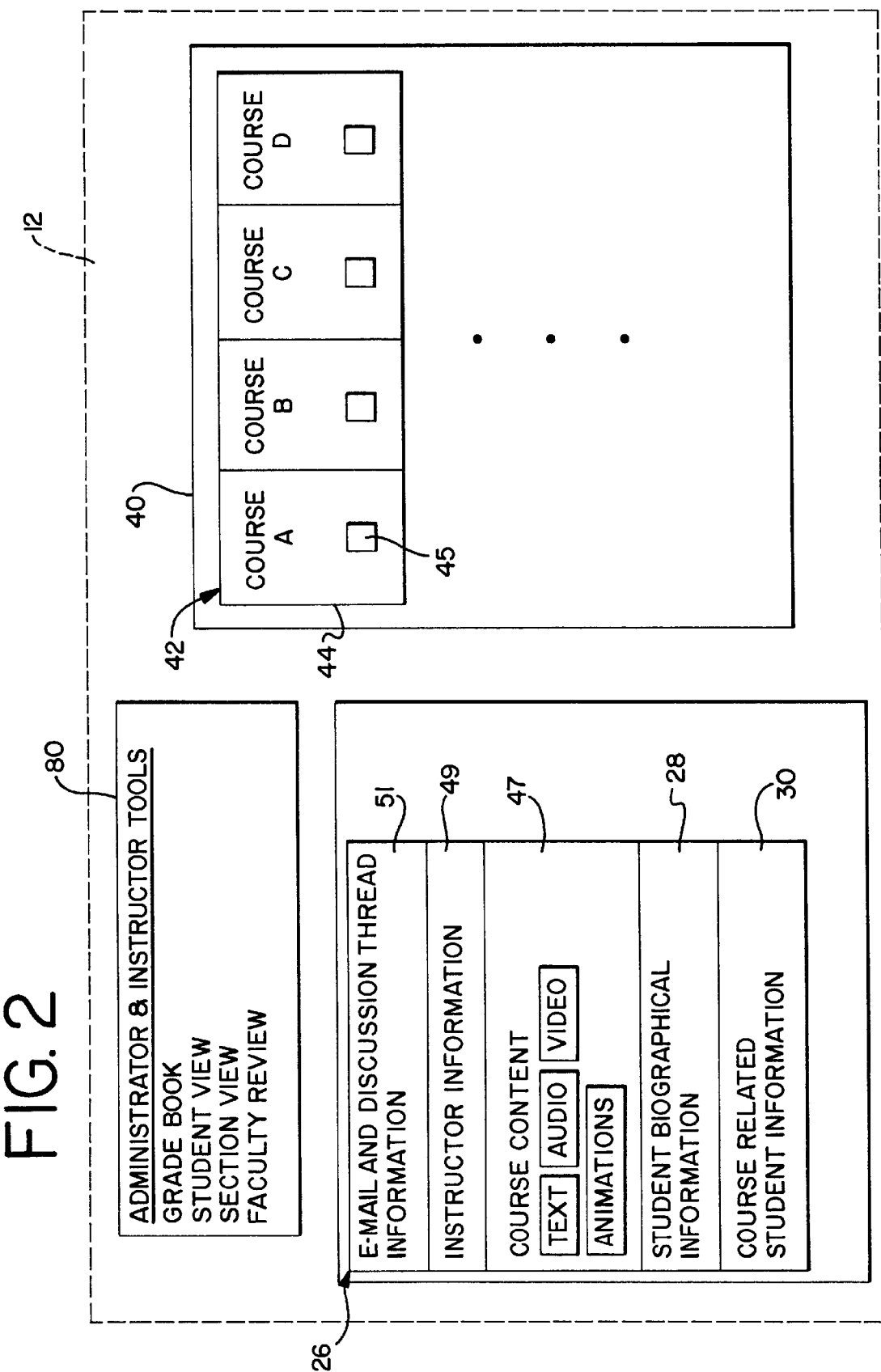
FIG. 2 is illustrates types of data and applications preferably stored in the server side of the computer network of FIG. 1.

The preferred type of courses resulting from the blending of these two approaches, along with the problem-based learning technique, are course suites providing a learning experience, and containing material, not typically available in any one place. As shown in FIG. 2, the server side 12 of the network 10 contains a course database 40 where each course suite 42 resides. Each course suite may comprise multiple separate courses 44 that cumulatively provide the substance and experience of an entire university level course, but in discreet logical pieces more suitable for the online environment. In one embodiment, the courses 44 consist of templates 45 created in HTML format using an HTML generator such as Dreamweaver available from Macromedia, Inc. of San Francisco, Calif. One or more templates represent the instructions necessary to build each page of the course 44 requested by a student. The templates 45 may include executable software, such as JavaScript commands, and include references to the course content data 47, stored in mass storage 26 on the server side 12, necessary to populate the HTML templates. Standard business logic programmed in Java or any of a number of commonly available languages may be used to provide an interface between any disparate platforms maintaining data on the server side 12 using standard common object request broker architecture (CORBA).

Students logging on to the Internet from their respective user computers 14 to access their particular course 44 will provide identification information, such as a user ID and password, to access the course that he or she has registered in. If this is the first time a student has accessed or attempted to register for a course, the student will be prompted for appropriate biographical and financial information. Once the student has registered for a course, an appropriate one of the variety of courses 44 and course suites 42 stored on the server side 12 of the network 10 are accessed by software code operative on the servers 24 to present the appropriate course and materials to the student.

Referring to FIG. 2, each student provides biographical data 28 to the server side 12 when they register for a course. Biographical data includes name, email address, physical address, telephone information, company, and position (if employed). Because the online educational services offered in the network 10 may be accessed by numerous students worldwide, other information such as time zone and native language may also be recorded. This information on biographic data is preferably stored in a database on the mass storage device 26.

In addition to biographical data, the server side 12 of the network 10 also stores and tracks student information relating directly to the coursework and related activities of each student. This course-related student information 30 includes student status (whether the student is active/inactive), the date the particular course began, information as to previous courses the student has taken, and the personal schedule of a student as it relates to the availability of the student to access the online educational environment on a timely basis. The course-related student information stored in the server side 12 also includes information such as whether the student has received the necessary books for the course, whether evaluations for instructors or assignments have been completed, the number of complaints logged by the student in the present or previous courses, and similar administrative student information. Each time a student accesses the online course materials and resources, a record of the student's access, also referred to as the clickstream, is recorded. The student clickstream record may include time, date, duration and type of accessed resource data. Other information stored in mass storage 26 includes instructor information 49 and course email and threaded discussion information 51.

Figure 3:
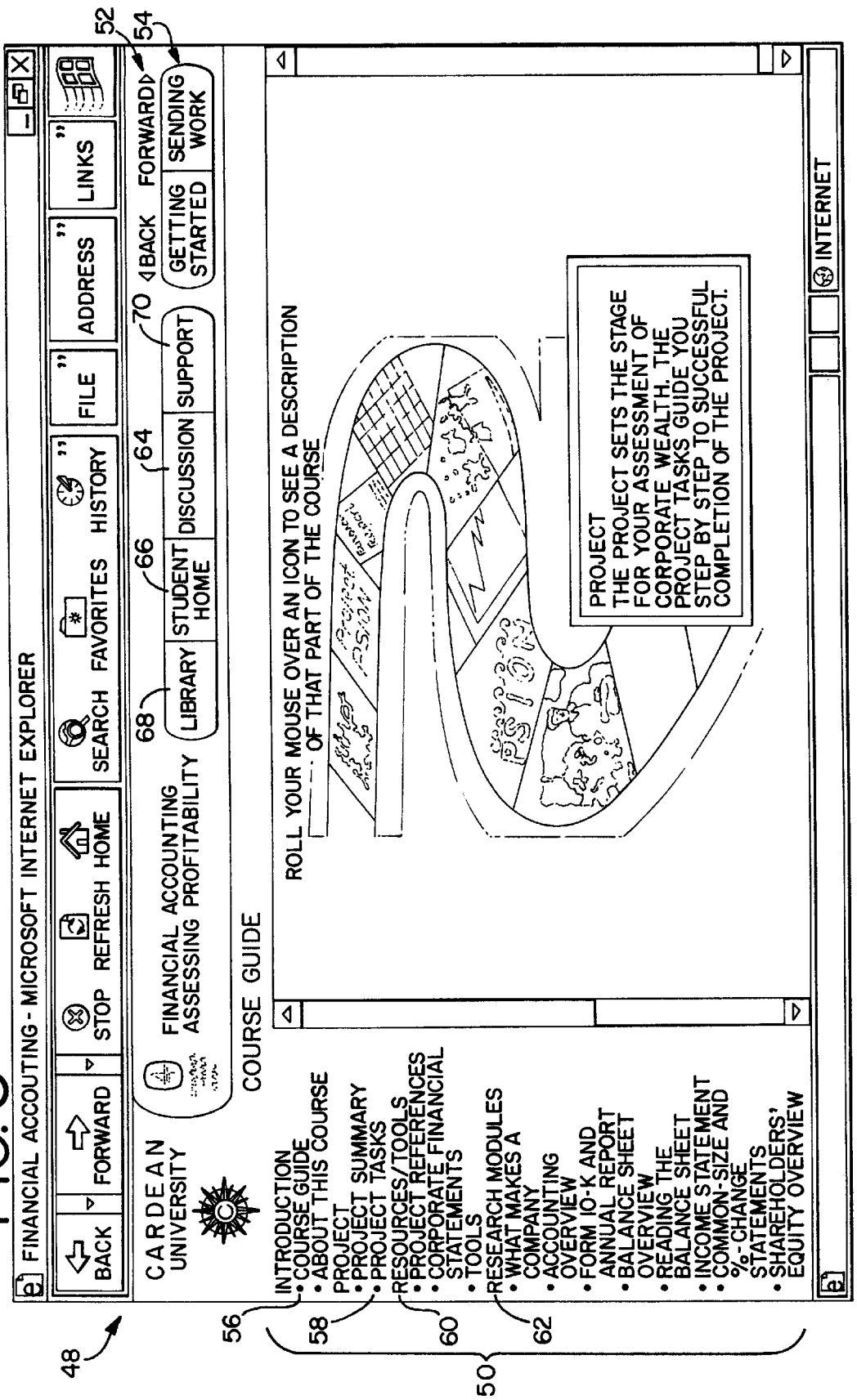
FIG. 3 shows a student graphic user interface for a preferred online educational course operative on the computer network of FIG. 1.

An example of a student graphic user interface 48 for one preferred embodiment of an online educational course is shown in FIG. 3. The student user interface is preferably visible to students on user computers 14 and is operative to present student specific course information. In the example of FIG. 3, a student's web browser displays information retrieved from the server side 12 of the network 10 relating to a financial accounting course. Information is preferably transmitted in data packet formats that may, in one embodiment, conform to the transmission control protocol/Internet protocol (TCP/IP). In a TCP/IP implementation, a packet network terminal server in the server side 12 is assigned a unique Internet protocol (IP) network address. TCP/IP switching equipment within the network can direct a TCP/IP packet to an intended recipient based on the packets' destination IP address. Other implementations may use other networking protocols and packet formats.

As mentioned above, the information passed to the user computer 14 is preferably assembled from a collection of HTML templates stored on one or more servers operating database software such as BroadVision database software. Information and data for the particular course page represented by the HTML template is drawn from the mass storage device. The resulting stream of information, generated by populating the HTML template in the server side of the network with the data required by the template, is sent to the user computer. The browser software interprets the HTML commands received to arrange the accompanying course data so that the student sees a screen such as shown in FIG. 3 on her user computer.

Additionally, each time a student logs on to the online educational service, the server side 12 of the network 10 records the student's presence. All of the student's subsequent activities are also recorded and catalogued by the databases residing on the server side 12 so that a complete picture of the student's activities is recorded. Each student's activities may be recorded based on the student's login information or other mechanisms, such as cookies, such that every selection and activity by the student is recorded. Referring again to FIG. 3, the interface 48 displayed on a user computer display to a student taking a course provides access to multiple resources. In one embodiment, the interface 48 may consist of a course resource navigation bar 50, an upper navigation bar 52, and an information display region 54. The image displayed in the display region 54 to the student who selects the course guide link 56 shows an image of the portions of the selected course.

When the user selects the course guide link 56, the user triggers a query for information located at an address identified by, for example, a Universal Resource Locator (URL) containing an address in hypertext transfer protocol (HTTP) associated with the course information in the servers on the server side 12 of the network 10. Information at the address is then retrieved, assembled and sent to the user computer 14 for presentation in the display region 54. Each of the links in the course resource navigation bar 50 on the interface 48 sends a request for information to the server side of the network and causes information to be retrieved. Examples of materials that a student may access include introductory materials such as the course guide 56, project information including a list of project tasks 58 that the student is required to complete in order to complete the course, resources and tools 60 related to the task presented to the student in the course, and numerous research modules 62 that summarize key points of knowledge that a student will need to know to complete the tasks. The research modules may provide background information on various topics, practice exercises and links to multimedia (video, audio, etc.) explanations of methods and terminology.

Students taking online courses may also link to, in a preferred embodiment, course discussion threads. The course discussion thread is preferably an online bulletin board maintained in the server side 12 of the network and accessible only to students of a particular course section and their instructor. Course discussion threads are focused on questions and issues directly related to the course. Both students and instructors may post messages to the course discussion thread. The course discussion thread may be accessed through a top navigation bar 52 that provides a discussion link 64. In one embodiment, the course discussion thread is maintained in one or more servers on the server side 12 of the network utilizing Lotus Domino software. Other links, such as a library resources link 66, a student home link 68, and a technical support link 70 are accessible on the upper navigation bar 52.

According to a preferred embodiment, an administrator and instructor tool application 80 (FIG. 2) provides authorized administrators and instructors (who may be advisory faculty or general instructors) for the online educational network 10 with the ability to manage and monitor student activity. In the following discussion, examples of instructor-level functionality are first discussed. Preferably, all authorized users, other than students, have access to instructor-level functionality. In the embodiment described below, an instructor is identified as utilizing certain functionality. Advisory faculty and administrators for the online educational network also have access to all of the instructor-level functionality. Each of the instructors, advisory faculty, and administrators is identified by the online educational network through her respective logon and password information. Any of a number of known authentication and security techniques may be used for this purpose. In one embodiment, the user interface may display a complete set of information and functionality access mechanisms to all users and deny access to users on a request-by-request basis. In another embodiment, the user interface may be tailored to display only those information and functionality access mechanisms appropriate to that particular user. Although the embodiment described below provides a hierarchy where instructors have a first level of access, advisory faculty have a second level of access that includes the first level, and administrators have the highest level of access (including everything available at the first and second levels), other embodiments may provide additional layers of information and functionality access, or access to various pieces within a certain level.

Figure 4:
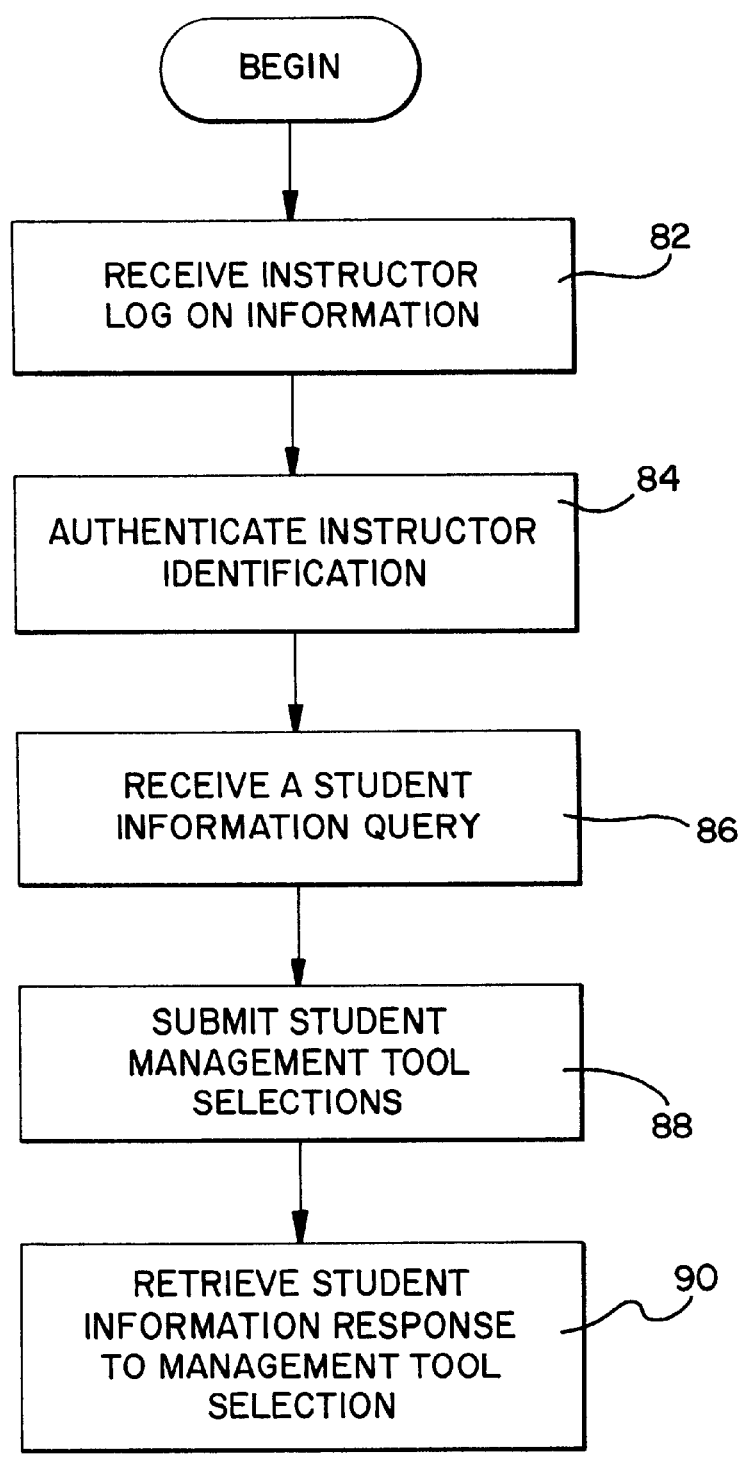
FIG. 4 is a flow diagram of a method of providing administrators and instructors information on students using instructor tool applications.

Referring to FIG. 4, an instructor provides logon information, for example a user ID and a password, to the server side 12 through a user computer 14 (at 82). The server side 12 authenticates the instructor's information (at 84) and will receive and act on a student information query (at 86) if the instructor is an authorized instructor registered with the online education network. In response to the instructor query, the server side accesses the administrator and instructor tools 80 and transmits student management tool selections to the instructor (at 88). When an administrator and instructor tool selection is made by the instructor, the appropriate student information is retrieved for the instructor from the student biographical information database 28, course related student information database 30, and any other databases maintaining student information. Preferably, the instructor only is permitted access to student information for students in her course sections. Specific types of information and instructor tools are described in greater detail below. The functionality of each of the administrator and instructor tools 80 available on the server side 12 of the network may be implemented in software code operative to retrieve and populate HTML templates with requested data in the same fashion as described above with respect to student access of the online educational courses 44.

Figure 5:
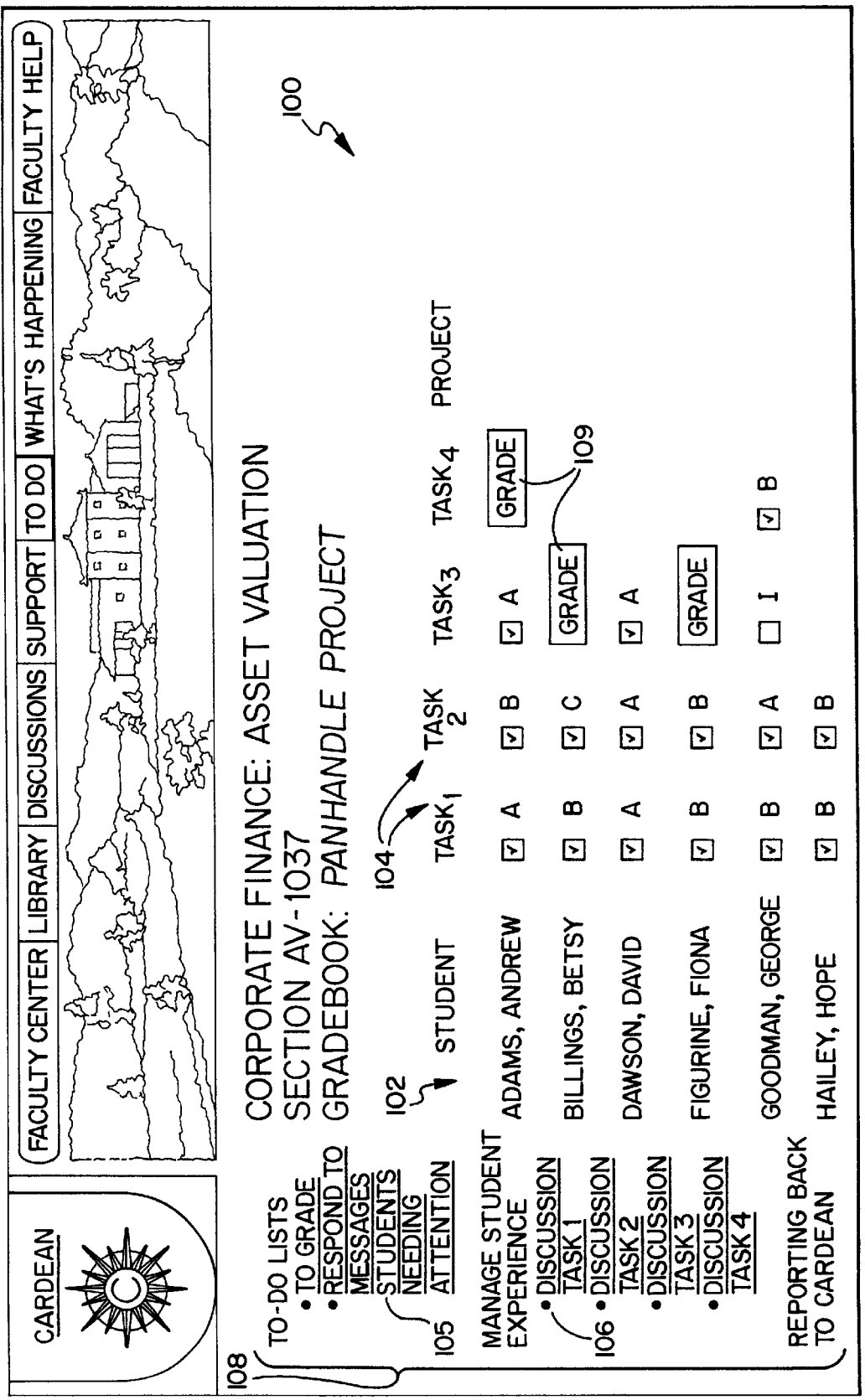
FIG. 5 is an online instructor grade book interface generated by an administrator and instructor tool application according to a preferred embodiment.
Figure 9:
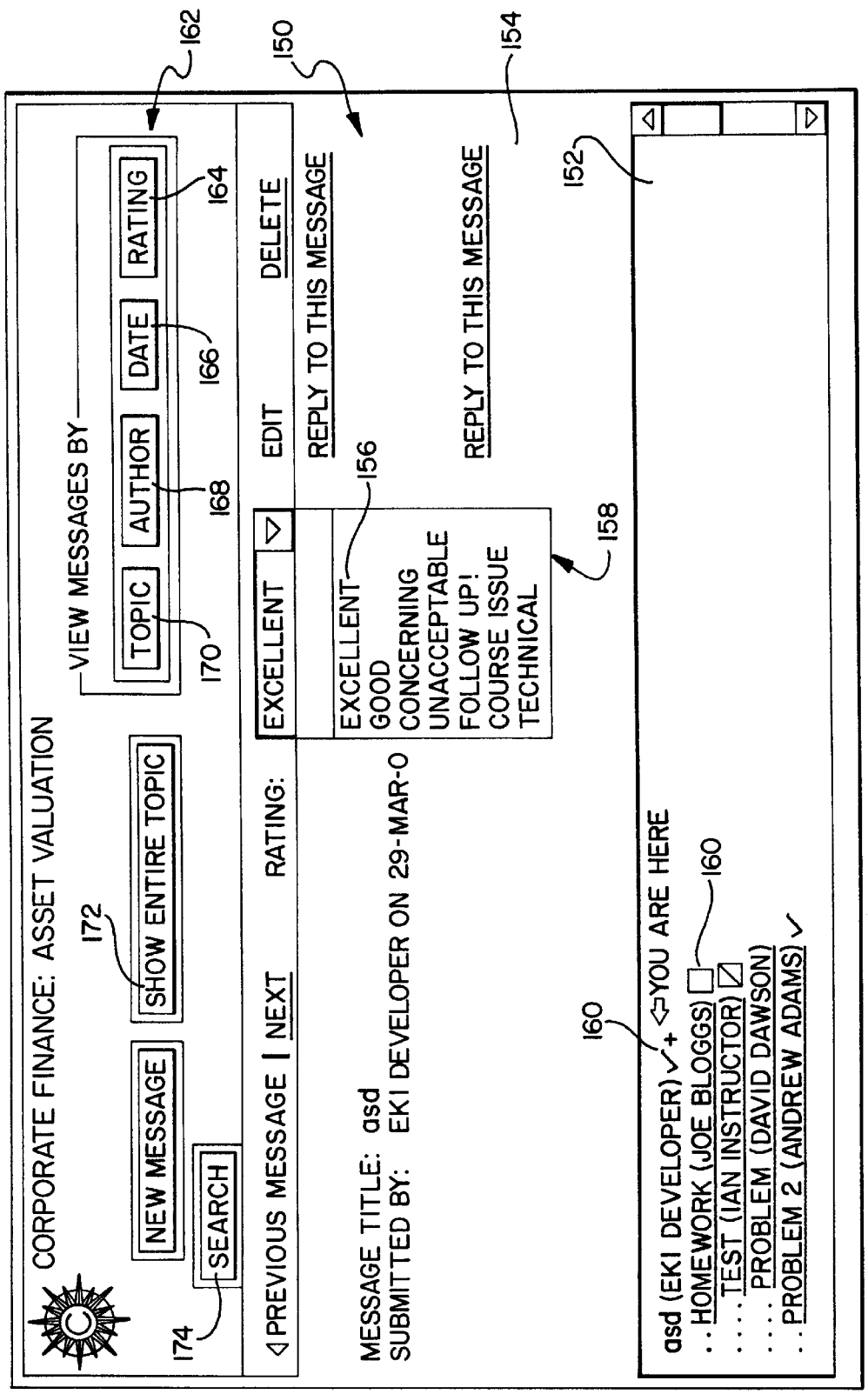
FIG. 9 is a discussion thread rating interface according to a preferred embodiment.

Referring to FIG. 5, an embodiment of one interactive instructor tool, specifically a grade book screen 100 provides instructors for the online educational courses current information on grades assigned to students in their section for various tasks required of the course. As described above, only students assigned to a particular instructor are accessible by the instructor. If an instructor is teaching more than one section of a course, the instructor may provide information to indicate which section she is interested in and receive displayed information for that particular section. As shown in FIG. 5, an embodiment of an online grade book includes a listing of student names 102 in a table format associated with grade entries 104 for those tasks graded and previously posted. Although the embodiment of FIG. 5 indicates letter grades assigned to each graded project, other grading scales may be implemented.

Students preferably submit completed tasks in an electronic format, for example via email, to the instructor so that a database in the server side 12 of the network 10 may then store the assignment and create a link to its location for the instructor the next time the instructor accesses the grade book. In one embodiment, students may attach a completed assignment to an assignment inbox via a student grade book view screen displayed on the student computer. The student view 131 of the grade book, as shown in FIG. 8, provides a view of the grade 133 assigned for each assignment 135 submitted, along with the date submitted 137 and date graded 139. The student sees a submit button 141 for each assignment remaining. Each submit button 141 preferably automatically links the student to an assignment submission form pre-populated with relevant information such as student name, course name, section identifier and task identifier. The assignment attached to the assignment submission form is routed to a database, such as a CRM database as described above, when the student submits the completed assignment. A time stamp is automatically generated at the database upon receipt of the assignment. Additionally, the data on the prepopulated form may be used to cross-reference the assignment to the section, course, instructor and other parameters for later retrieval and use.

Referring to the embodiment of FIG. 6A, an alternate grade book display format 120 is illustrated with a grade scale made up of non-traditional letter indicators 122, such as M, P, I and N (for Mastery, Passing, Needs Improvement and Incomplete, respectively). In addition to the letter grade, the grade book display may include an assignment attempt indicator 124 denoting a student's first attempt at a homework assignment with a single indicator marker and a second attempt at a homework attempt with multiple markers. Alternate embodiments of graphical grade indicators 127, 129 are illustrated in FIGS. 6B and 6C.

In order to assist instructors in prioritizing which student assignments require attention, the grade book administrator and instructor tool preferably generates an elapsed time indicator 126 indicating the time elapsed from when each student submitted a homework assignment. This elapsed time may be generated by the instructor grade book tool on the server side of the network 10 by comparing the time stamp of the received homework to the time that the instructor logs on to the network. As shown in FIG. 6A, the elapsed time markers 126 may include text and/or graphics. Preferably, the visibility of the marker 126 changes to indicate greater urgency as more time elapses. The change in the marker 126 may be implemented as an increased size, a pixel blinking mechanism, or other visual indicator.

Additionally, the markers 126 may be set to change size or other features after predetermined time increments. The instructor grade book tool updates the elapsed time markers displayed to an instructor each time the instructor logs on to the network, or in an alternative environment, may be automatically refreshed through instructing the instructor's browser software to automatically refresh the link. Similar to grade button 109 shown in the embodiment of FIG. 5, the display 120 of FIG. 6A provides a visible, ungraded student assignment link 128 allowing the instructor ready access to a particular student's ungraded assignment. Preferably, the instructor grade book display incorporates redundant perceptual queues, such as combinations of shape, color, blinking features or icon movement, etc., to enhance administrator or instructor comprehension of grade related information.

When an instructor views the grade book display screen and decides on a student assignment to grade, the instructor clicks on the button or other indicator to retrieve the student's assignment from the database side of the network. The instructor may download an assignment to view immediately, or the instructor may download and print the assignment to grade at a later time. As shown in FIG. 7, the link selected by the instructor provides the instructor with a grade submission template 130 identifying the student assignment 132 and containing an comments 134 provided by the student to explain issues related to the assignment. The grade submission template 130 provides the instructor with a text box 136 within which to generate a message to the students with comments on the assignment. After reviewing the assignment through an automated link in the grade book, the instructor accesses a grade menu 138, such as a pull down menu listing letter or symbol grade designations, and selects the appropriate grade. When the instructor finishes grading, she may click on the save button 140 to transmit the grade and any comments back to the database in the server side of the network. In other preferred embodiments, the grade submission template and/or the grade book include links to previously graded assignments for the student or other student's graded assignments along with the option of displaying different assignments alongside one another. The grade menu 138 of the grade submission template may include a collection of prepared comments or hints for the instructor to access and paste into the text box 136 when grading assignments. Once a grade is entered, the student can view the grade in a student view 131 of the grade book (See FIG. 8).

As discussed above, one useful teaching and communication tool provided in a preferred embodiment of the online educational courses is the guided discussion thread. The discussion threads operate in an online bulletin board environment to permit students, and the instructor, to read and post messages on issues directly related to the course. Preferably, the instructor is provided access to the discussion thread through the instruction interface tools 80. Referring again to FIG. 5, an instructor may view a discussion by selecting a link 106 on a navigation bar 108 displayed to the instructor to retrieve a listing of postings to the discussion by topic and date. In order to assist the instructor in assessing student participation in discussion threads, a discussion thread rating interface 150, such as illustrated in FIG. 8, permits the instructor to selectively open and attach ratings to various messages. Activating the discussion thread link 106 (FIG. 5) preferably triggers the administrator and instructor tool module 80 to assemble the discussion thread rating interface 150 and draw in the appropriate posting references into the first window 152. In one embodiment, a first window 152 is presented to an instructor displaying a scrollable list of the postings in the discussion thread and a second window 154 displays a selected one of the messages in the scrollable list 152. Alternatively, the instructor may access the discussion thread through a link 64 (FIG. 3) on a navigation bar 52 on the instructor's display.

An instructor preferably uses the discussion thread tool interface 150 to review and append a rating to student postings. The instructor appends a rating to a posting by selecting a rating 156 provided in a pull down menu 158 in the discussion thread interface 150. Preferably, the assigned rating is then indicated next to the student posting in the form of a graphic or icon 160 in the listing of postings viewed in the lower window 152 of the instructor discussion thread interface 150. Although the ratings are displayed to the instructor, students preferably do not see any indication of the assigned rating. A discussion thread navigation bar 162 on the discussion thread instructor interface 150 contains buttons operative to sort postings by rating 164, dates 166, author 168 and topic 170. Other discussion thread navigation functions, such as a button 172 to display all messages directed to one topic or search button 174 to look for messages based on customized search criteria are also provided in the discussion thread navigation menu 162. In one embodiment, student postings may count toward a task grade in a particular online course. The ratings provided by an instructor may be tallied and used to efficiently and automatically generate a grade for each student relating to postings. For example, the instructor may count up the number of "excellent" or "good" comments that she has given to a student and provide a indication that the student rates a separate commendation (e.g. a statement of "with distinction") in addition to the overall course grade. Conversely, the ratings assigned to the discussion threads may be a tool to quickly identify inappropriate postings, for example a posting that constitutes sexual harassment or some other type of inappropriate behavior, so that students may be warned or removed from the course.

Figure 10:
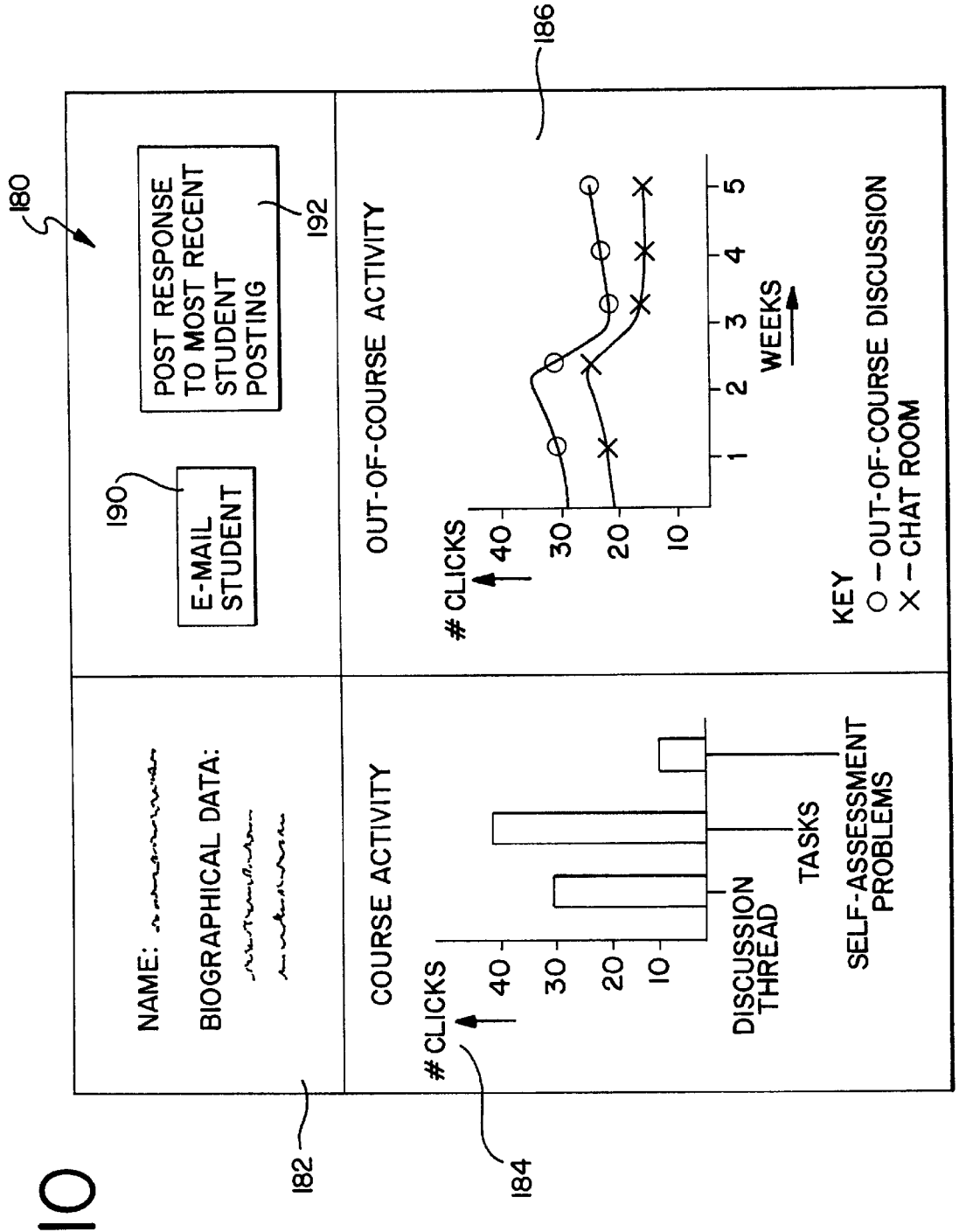
FIG. 10 illustrates a dashboard view containing multiple graphical views of information related to a particular student in an online educational course according to a preferred embodiment.

As part of the administrator and instructor tool set 80 available to instructors for managing and monitoring student activity (and to administrators to monitor student and instructor activity), instructors preferably may request a variety of information on students in their sections, student performance, and their own efficiency as instructors. Not only does the instructor tool set provide access to up-to-date information, it preferably generates graphical or tabular representations of the data discreetly or collectively. An instructor may request individual or section data in this manner. For example, as illustrated in FIG. 10, an instructor can quickly access a particular student's performance using a dashboard view screen 180 generated from data stored in the server side of the network as requested by commands in the administrator and instructor tool set 80. This data is accumulated from submissions from the student (e.g. biographical data provided during course registration) and by the student's activity in the online course.

A first section 182 of the dashboard view screen preferably presents biographic data for the student, such as name, address and contact information. A second section of the dashboard view may be a graphical representation of course activities. The course activity information may be generated from a number of clicks, or a number of times a link is accessed by a student, for activities directly related to the online course. Course activities may include viewing research modules related to the course, accessing the tasks in the course, posting or viewing material in the discussion threads, or viewing the resources and tools provided to assist the student in the course. In one embodiment, the second section 184 of the dashboard view 180 may illustrate the course activity in terms of a bar chart 186 having a separate bar for each activity tracked and extending along an axis listing the number of clicks by the student into that course activity. In alternative embodiments, overlaid linear graphs may be generated having an X-axis illustrating time (week number of the course) and a Y-axis indicating the number of clicks. In a third portion 186 of the dashboard profile, a similar graphical representation of out-of-course activities may be presented. The out-of-course activities may include postings to threaded discussions related to other online educational issues posted by the host system, the number of times the online library resources have been accessed, clicks into chat room discussions, and other activities indirectly related to the course. Another section 188 of the dashboard view 180 may contain a link 190 to automated email forms providing a pre-addressed form for the instructor to directly email the student. In other links such as a threaded discussion link 192 that may, for example, access recent posting by the students to allow the instructor to post a note in the discussion thread to the student.

Figure 11:
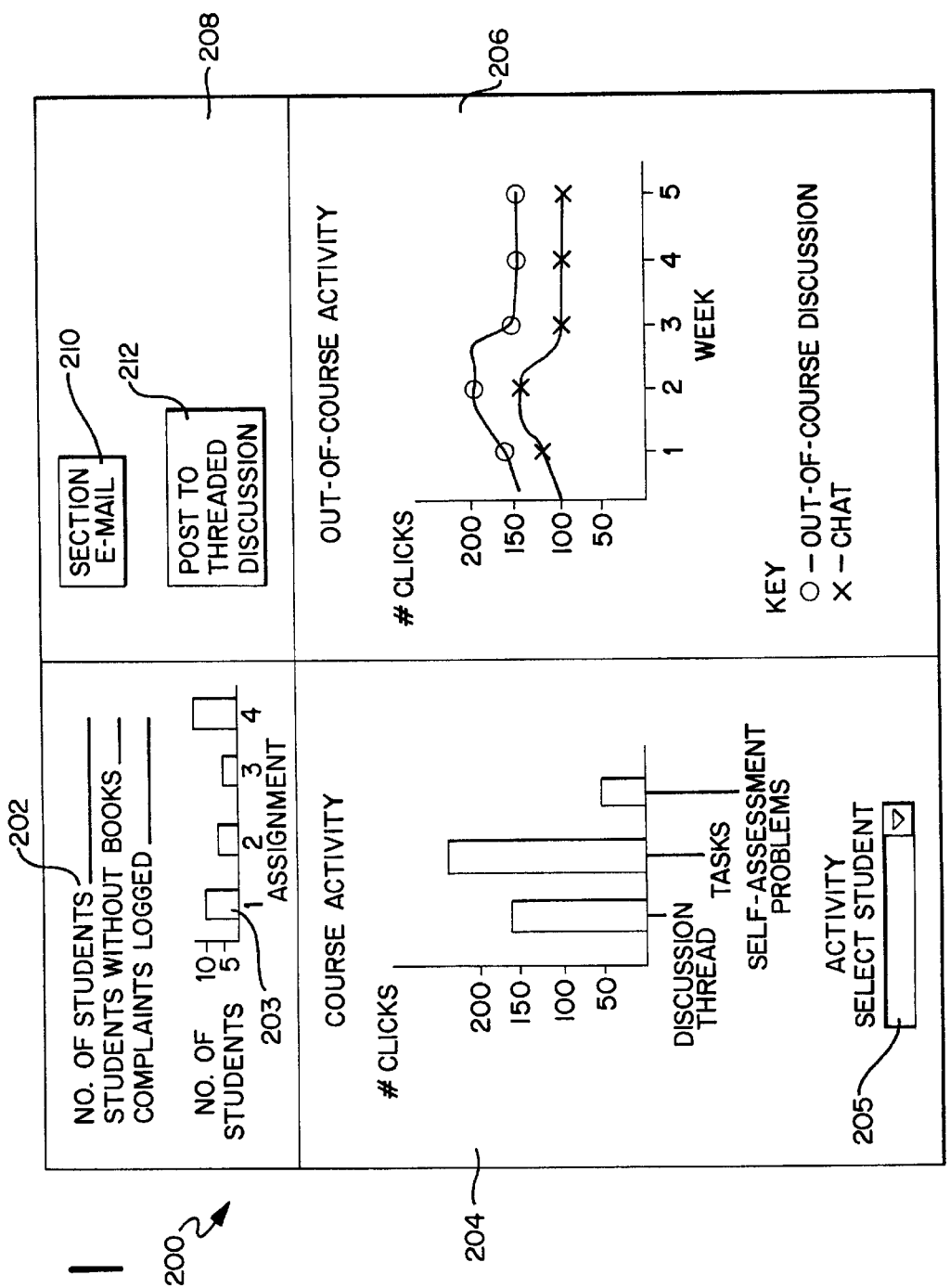
FIG. 11 illustrates a dashboard view containing multiple graphical views of information related to students in an entire course section in an online educational course according to a preferred embodiment.

As illustrated in FIG. 11, a similar dashboard view 200 may be accessed through the instructor interface to invoke the administrator and instructor tools 80 to retrieve and generate class profile information. A student demographic section 202 may occupy one section of the class profile dashboard view 200. The student demographic section 202 includes course and student summary information regarding the number of students, the number of students without the recommended course books, a listing of complaints or compliments logged and related information. The student demographic data section 202 may also be configured to display graphical status information for the section including a bar chart 203 of student assignment submissions graphically illustrating the number of students having turned in the assignment for each of a preset number of assignments in the online course. An course activity section 204 and an out-of-course activity section 206, similar to the sections displaying of these pieces of information for an individual student, may be included. A class communication section 208 preferably provides for a link 210 to automatic email templates that are pre-addressed to students in the instructor's section and a link 212 to the threaded discussion for the section. Each of the sections providing students course section information to an instructor preferably allows the instructor to zoom in and display the section on the entire screen presented to the instructor. Alternatively, the instructor interface preferably permits the instructor to select links in navigation bars on the screen to directly go to a specific type of information illustrated in the composite view. For each section of the composite display, or if only a particular one of the student information displays is shown, a student selection mechanism, such as the pull down menu 205 shown adjacent the course activity section 204, may be provided for ease of instructor access to a particular student.

Another administrator and instructor tool operative on the server side 12 to assist instructors is an instructor reminder mechanism that can be manifested in the form of a link on an instructor interface to students needing particular attention. Referring again to FIG. 5, the instructor interface generated by the programming operative on a processor in the server side of the network can provide a link 107 identified as "students needing attention" that retrieves a list of students having any of a number of difficulties or performance concerns. For example, the administrator and instructor tool programming can automatically generate a list of students who have not accessed the online course materials in more than a recommended period of time. The administrator and instructor tool can also compile information on students needing attention due to the instructor's tardiness in responding to course duties. For example, the instructor reminder mechanism can compile and display to the instructor outstanding email inquiries from students or ungraded assignment reminders that need attention.

Figure 12:
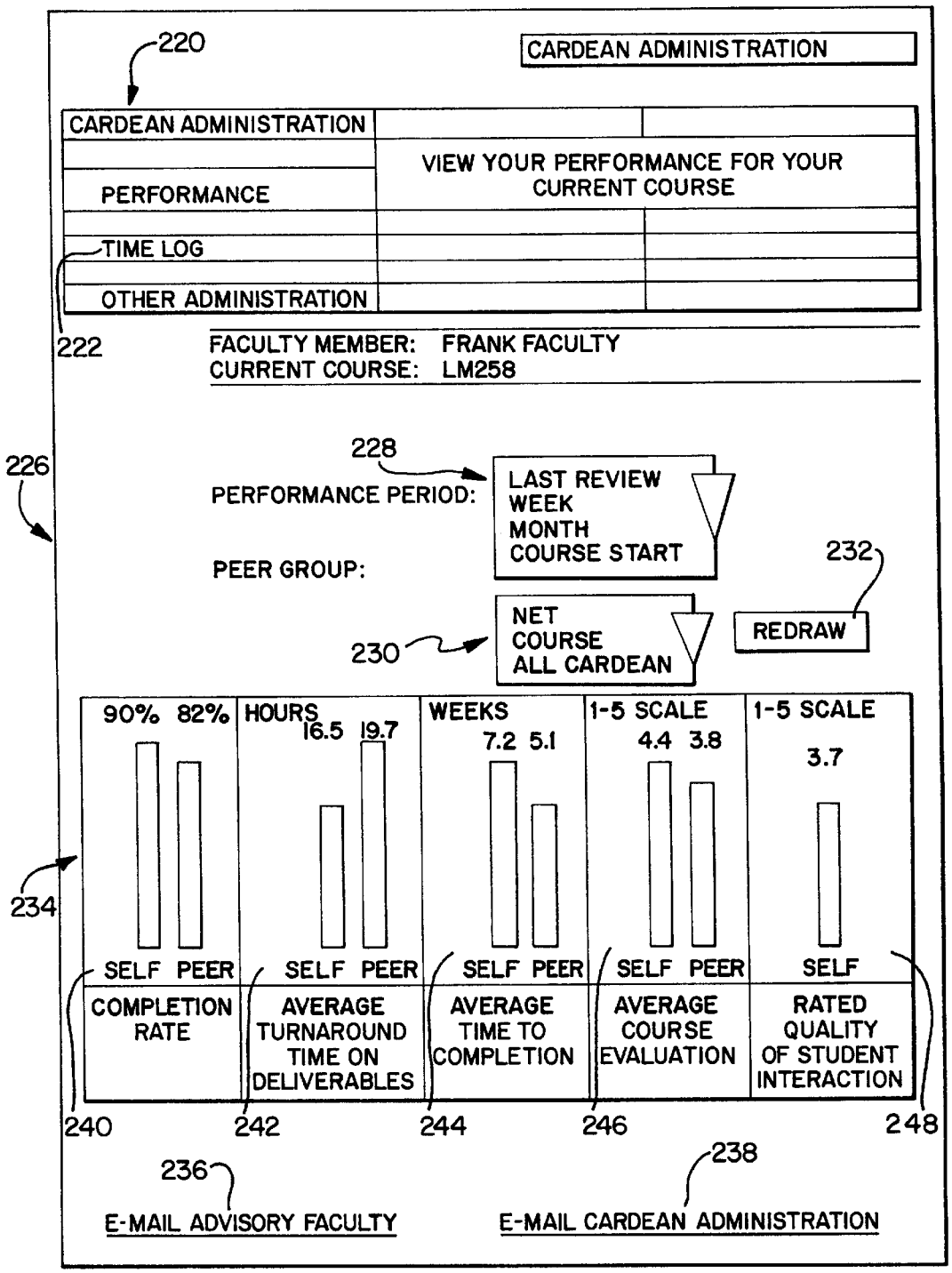
FIG. 12 is an instructor administration screen illustrating instructor performance information.

In addition to the student performance tracking capabilities provided to instructors, the administrator and instructor tools provide instructors with self-evaluation information. Preferably, each instructor submits a time log to the online education network on a regular basis. The time log may be accessed with, and information entered through, an instructor administration screen set selectable by the instructor through an administration navigation bar 220 such as shown in FIG. 12. The time log link 222 preferably calls up a time log entry screen prepopulated with the instructor's name, course section and time of last log entry. The instructor then enters in the time spent on various key tasks such as monitoring discussion threads, grading, reviewing and responding to student emails, handling technical problems and other time dedicated to the online education system. After entering the various times in the form, the instructor may submit the form using an automated link that sends the information to a database, such as a CRM database, maintained on the server side 10 of the system.

Referring again to FIG. 12, the instructor may access her performance information using a performance link 224 on the navigation bar 220 of the administration display 226. The instructor may select from a performance period menu 228 and a peer group menu 230 to create a textual or graphical comparison chart 234 showing instructor performance criteria. The performance period menu 228 may present selections of performance since previous review, performance over past week or month, or performance since the start of the course. The peer group selection 230 may include comparison with other instructors in a Net, defined as the group of instructors supervised by a particular advisory faculty member, other instructors teaching the same course, or all other instructors active in the online education system 10. The instructor may then select to regenerate the displayed information according to the selected performance period and peer group using a redraw button 232 displayed on the instructor's computer screen.

The graphical comparison chart generated for the instructor may include separate bar charts for student completion rate, average turnaround time for grading assignments, the average time a student needs to complete a course, the average evaluation received from students and the quality of interaction with students. Preferably, all of the information is automatically gathered from the databases in the server side 12 based on instructor log entries, student evaluations, and automatically date stamped information maintained in the system. Any of a number of commonly available tools for reporting and presenting data, such as those available from BroadBase, BroadVision or Oracle, may be utilized and executed on the server side of the system to generate averages or percentages that the instructor's computer receive in the form of textual or graphical information. The instructor may also directly email the appropriate advisor, faculty member or an administrator using the same administration display 226 with any questions or comments relating to instructor performance using advisory faculty or administrator email links 236, 238 that automatically generate pre-addressed email forms, or email forms with menu selectable addresses.

Figure 13:
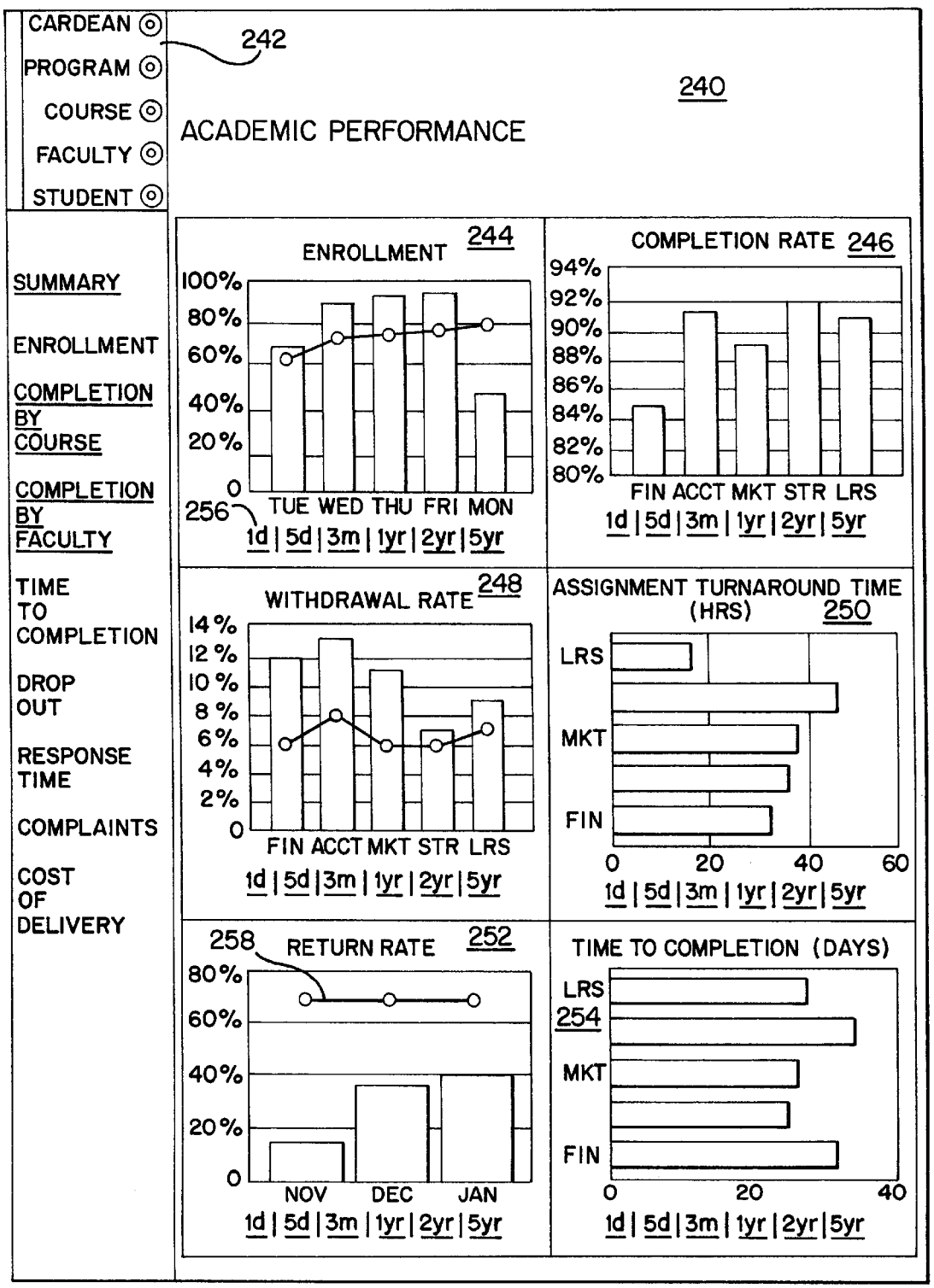
FIG. 13 is an administrator dashboard view summarizing overall academic performance in an online educational environment.

FIG. 13 illustrates an administrator dashboard view of overall academic performance 240 accessible by administrators of the online educational network and assembled by the administrator and instructor tool set. The administrator dashboard view is automatically updated from data maintained in the server side of the network each time the administrator dashboard view 240 is accessed. The dashboard view indicates the view level 242 represented by the data. In FIG. 13, the view level 242 is indicated by a graphic as the highest (e.g. online educational network as a whole) such that the data is an overall picture of academic performance for the online educational network. Other selectable levels of view include a program view (e.g. all students of an MBA program), course view, faculty view and student view. The data presented to an administrator steadily narrows in focus from the top of the view level 242, where data relevant to the entire online institution is presented, to the individual student level where the administrator may focus on just one student.

In the online educational network view, referred to as CARDEAN in FIG. 13, the dashboard view generates an enrollment chart 244, a course completion rate chart 246, a student withdrawal rate chart 248, an assignment turnaround time chart 250 a student return rate chart 252, and a time to completion chart 254. All these charts are preferably positioned on the same computer display page so that the charts are viewable simultaneously on the screen or by scrolling down on the same screen. Although the information is shown in the form of bar charts in FIG. 13, any of a number of known graphical formats may be used for displaying the information in the dashboard view screen 240. In other embodiments, the data for a given chart may be displayed in alphanumeric form. Each of the charts may include a time scale selection 256 that will manipulate or average data stored on the server side for a desired time period. The administrator and instructor tools may be programmed to provide fixed time scale selections such as the 1 day, 5 day, 3 month, etc. shown, or a customized selection where an administrator may enter a desired time scale. In one embodiment, the same default time scale is automatically applied to each of the different information charts when an administrator initially calls up the dashboard view 240 onto her screen.

The enrollment chart 244 includes the percentage of capacity or goal for enrollment for a given time period. A completion rate chart 246 provides the percentage of students completing each of a selected number of courses (e.g., finance, accounting, marketing). The withdrawal rate chart presents percentage of students voluntarily withdrawing from each of a selected group of courses. The assignment turnaround time chart 250 presents administrators with the average overall time it takes instructors for each of a selected group of online courses to review and grade assignments, exams, or other student course deliverables. The return rate chart 252 represents the percentage of students, who have previously enrolled in courses in the online educational system, returning to take additional online courses. A time to completion chart 254 on the administrator dashboard display 240 presents the average length of time student have taken to complete each of a selected group of online courses. Each of the charts on the administrator dashboard 240 may also include a superimposed graphic indicator 258 such as illustrated in the return rate chart 252. The superimposed graphic indicator 258 may be selected to illustrate a desired goal for the data displayed or it may show a historical trend for the more recent data displayed in the chart. For example, the indicator 258 in the return rate chart may show the average November, December and January return rates for the past 10 years, while the bar charts indicate the return rate for November, December and January of the present year.

The view level indicator 242 allows the administrator to retrieve a degree program (e.g., MBA, MSIT, etc.) screen 260. In one embodiment, the degree listing screen 260 includes a listing of degree programs 262, course suites 264 required for the degree program 262, and any discrete courses 264 within the course suites as shown in FIG. 14. Each one of the programs, course suites and discrete courses preferably include a link that automatically queries the databases on the server side of the system for academic performance data tailored to the selected program, course suite, or discrete course. Thus the administrator dashboard view 240 may be generated from the program selection level, or the course selection level, to provide statistical information relevant to the program or course in the same manner as was described for the entire online educational system in FIG. 13.

Figure 16:
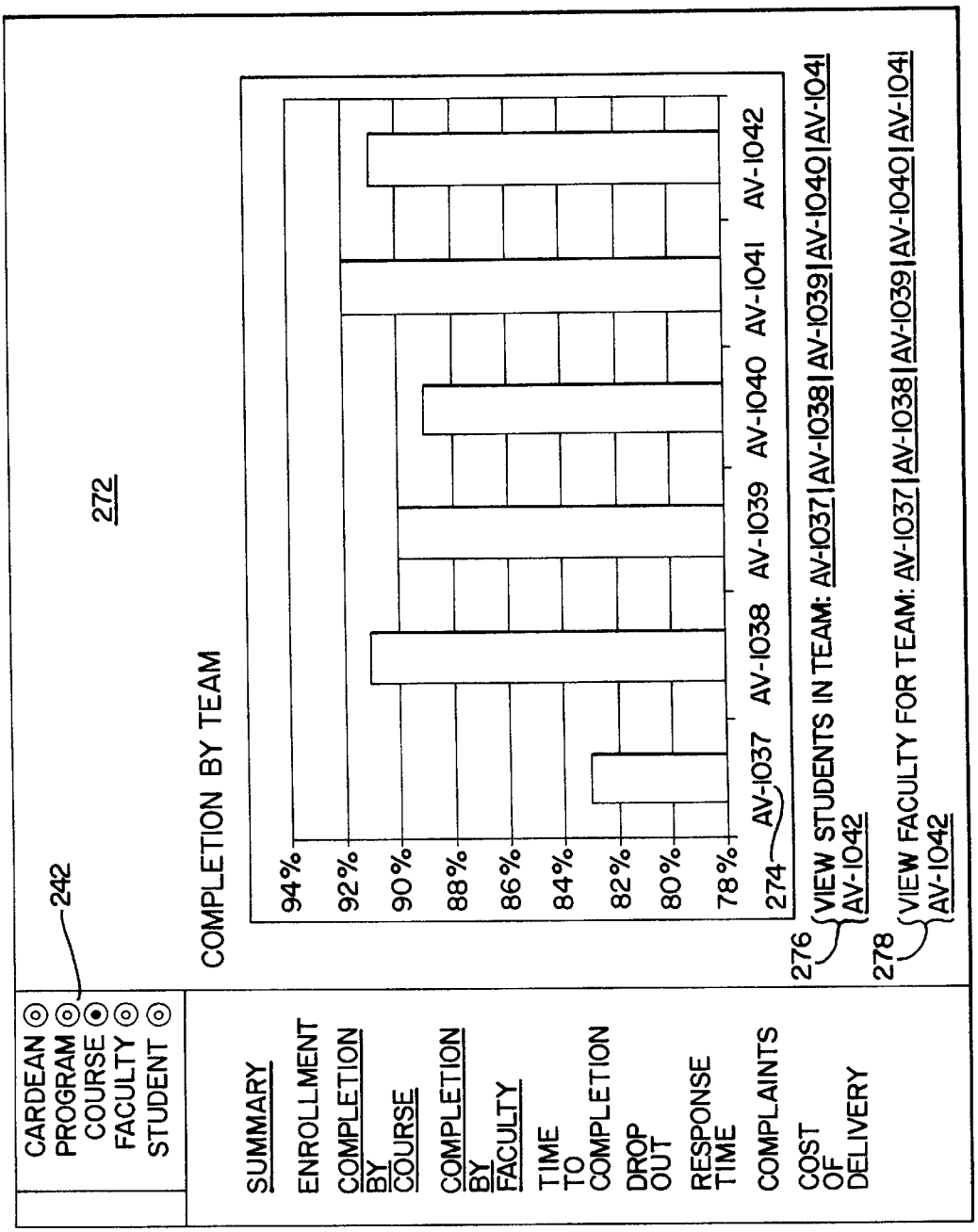
FIG. 16 is an interactive chart illustrating completion rates of students by section in an online educational system.

Similarly, administrators can select the view level 242 to provide specific course information. As shown in FIG. 15, a course selection menu 268 lists all of the courses offered by the online educational system. Each course selection link 270 is configured to respond to a user selection to query the database on the server side of the system and return relevant information concerning the selected course. For example, one information format provided by the administrator and instructor tools at the course view level is a completion by team chart 272, as shown in FIG. 16. The completion by team chart presents the percentage of students completing the selected course for each course section 274. The completion by team chart 272 includes student section links 276 and links 278 to faculty for each section. These links 276, 278 permit quick and convenient navigation capabilities for the administrator.

When a faculty or student view is selected in the view level area 242 of the screen, an administrator may track down a specific faculty member or student. FIG. 17 illustrates a faculty selection screen 280 containing faculty links 282 to all data for each listed faculty member/instructor. If an administrator or advisory faculty member needs to review a particular faculty member, the administrator or advisory faculty member selects the desired faculty member link 282 and is presented with that faculty member's screen 283 listing personal data listing 284 and history with the online educational system 286 as seen in FIGS. 18–19. The personal data listing 284 may include contact information 286, educational background 290 and so on. The history 286 section preferably includes information on when the faculty member was trained 292, a list of courses previously or presently taught 294, evaluation status 296, a list of any student complaints 298, and an automatic messaging link 300 that will present a pre-addressed email or messaging template for the administrator to contact the faculty member. As with the other screens generated by the administrator and instructor tool, all information on the faculty member is automatically updated each time a user accesses the screen.

As shown in FIG. 19, a team performance dashboard view 302 for the course section(s) taught by the faculty member is also presented when the particular faculty member's screen 283 is accessed. Examples of data presented to the administrator or advisory faculty member include a completion rate chart 304, a withdrawal chart 306, and a return rate chart 308 for tracking the percentage of students completing or withdrawing from courses taught by the faculty member, as well as tracking how many students return to take other courses offered at the online educational system after taking a course from the selected faculty member. Information charts for the faculty member's assignment turnaround time 310, the number of complaints received 312 and the time students take to complete courses taken from the selected faculty member 314 are also listed.

From the foregoing, an administrator and instructor application tool defining a system and method for managing and monitoring students and faculty in an online educational course has been described. Using the system and method described above, an instructor can efficiently review individual student performance or course section performance through instructor interfaces generated by administrator and instructor tools maintained on the servers of the online educational course network. With the ready access to student activity data, biographical data and communications media, such as email and discussion threads, an instructor using the student managing and monitoring tools can effectively assess student difficulties and quickly react to student needs. Typical instructor tasks, such as grading assignments, are also facilitated by the administrator and instructor tools described above. Similarly, administrators and advisory faculty can manage and monitor instructors and students the faculty application tool to gather and present data on the online educational system as a whole, or to easily focus in a specific faculty member or student and address specific needs of that student or faculty member.

It is intended that the foregoing detailed description be regarded as illustrative rather than limiting, and that it be understood that the following claims, including all equivalents, are intended to define the scope of this invention.

We claim:

1. A method of monitoring and managing student activities in an online educational course, the method comprising:
   receiving a completed student assignment in electronic form;
   associating the completed student assignment with an instructor and storing the completed student assignment in a database; and
   generating a grade book for the instructor, wherein generating the gradebook comprises:
      displaying grade information for each of a plurality of students in a course section taught by the instructor, wherein the grade book comprises student identification information, grade information for any graded student assignment, and an automated link to any completed student assignment that is ungraded; and
      displaying a visual time indicator for each completed student assignment that is ungraded, wherein the visual time indicator represents an elapsed time from a time each ungraded completed student assignment was received.

2. The method of claim 1, wherein displaying the visual time indicator further comprises increasing a size of the visual time indicator as the elapsed time increases.

3. The method of claim 1, wherein generating a grade book for an instructor comprising displaying the grade information in graphical format, wherein one of a predetermined set of graphical elements, each of the graphical elements representing a particular student performance level, is displayed for each graded student assignment.

4. The method of claim 3, further comprising displaying student activity completion indicia adjacent the graphical elements representing student performance level for graded assignments.

5. The method of claim 1, wherein the visual time indicator comprises a graphical visual time indicator.

6. The method of claim 1, further comprising generating a time stamp at the database upon receipt of the student assignment.

7. The method of claim 6, wherein the elapsed time further comprises comparing the time stamp to a time the instructor logs onto a network.

8. The method of claim 1, further comprising receiving an assignment submission form associated with the completed student assignment.

9. The method of claim 8, wherein the assignment submission form comprises a name of the student, a course name, a section identifier and a task identifier.

10. The method of claim 1, wherein a visibility of the visual time indicator changes to indicate greater urgency as more time elapses.

11. The method of claim 1, wherein displaying the visual time indicator comprises changing a size of the visual time indicator after predetermined time increments.

12. The method of claim 1, further comprising updating the visual time indicator each time the instructor logs onto a network.

13. A method of monitoring and managing student activities in an online educational course, the method comprising:
   receiving a completed student assignment in electronic form;
   associating the completed student assignment with an instructor and storing the completed student assignment in a database;
   generating a grade book for the instructor by displaying grade information for each of a plurality of students in a course section taught by the instructor, wherein the grade book comprises student identification information, grade information for any graded student assignment, and an automated link to any completed student assignment that is ungraded; and
   presenting an instructor with an assignment grading template in response to receipt of a request via the automated link to an ungraded completed student assignment for a particular student, the assignment grading template providing an automated link to any previously graded student assignment for the particular student, the assignment grading template further comprising an instructor comment section configured to receive instructor comments regarding the completed student assignment.

* * * * *